Patented Apr. 11, 1939

2,153,687

UNITED STATES PATENT OFFICE 2,153,687

METHOD OF TREATING ZINC OXIDE

Harlan A. Depew, Columbus, Ohio, assignor to American Zinc, Lead & Smelting Company, St. Louis, Mo., a corporation of Maine No Drawing. Application January 14, 1935, Serial No. 1,818

5 Claims. (Cl. 134—78)

This invention relates to the production of zinc oxide with particular reference to the rate of cure of rubber containing the same, and involves control of the acidity of the zinc oxide. When ordinary acidic American process zinc oxide is incorporated in rubber, the latter is slow in curing especially when certain accelerators, such as butyraldehyde anilin, are used, whereas the use of a low acidity French process zinc oxide results in a more rapid cure, and one of the objects of the present invention is to produce an American process zinc oxide that will cure at a rate similar to French process zinc oxide.

The addition of lime to the rubber to correct the acidity of American process zinc oxide has been tried, and although it satisfactorily speeds the cure of the rubber when diphenylguanidine is used as the accelerator, it is inadequate when butyraldehyde anilin is used.

I have discovered that if sodium hydroxide (NaOH) or potassium hydroxide (KOH) is used instead of lime to correct the acidity of the zinc oxide, the retardation of the cure of the rubber is overcome even when using an accelerator such as butyraldehyde anilin. Preferably a hot 25%–50% solution of sodium hydroxide or potassium hydroxide or both of these hydroxides is added in the form of a spray to the hot zinc oxide tumbling in a screw conveyor as it leaves the refinery. The sodium and/or potassium hydroxide may be added in the form of an easily decomposable salt, such as the carbonate, though this will be found to be less convenient and less satisfactory. Refining is usually the last step in the process of making zinc oxide, the crude oxide collected in the bag room being heated to improve the color and remove part of the adsorbed sulfur gases, and it is at the point where the oxide leaves the refinery that the hydroxide is preferably added. When the hot hydroxide solution is sprayed on the oxide as it leaves the refinery the hydroxide is apparently condensed on the zinc oxide particles and reacts with a large part of the zinc sulfate on said particles to form $Na_2SO_4$.

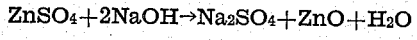
$$ZnSO_4 + 2NaOH \rightarrow Na_2SO_4 + ZnO + H_2O$$

Moreover, it will be apparent to experts in the art that the zinc oxide and sodium hydroxide would react to form sodium zincates.

The fume that comes to the bag room from the American process furnaces using the Wetherill grate ordinarily contains acidic sulfur gases, a part of which is filtered by the bags, and if the hydroxide solution were sprayed into the trail under these conditions, these sulfur compounds would be retained. But if the sulfur is limited by virtue of choice of ore and fuel, by processing or by using metal in place of ore, the hot hydroxide solution may be sprayed into the trail.

Although for economic reasons, it is preferred to incorporate the sodium and/or potassium hydroxide at some point in the regular manufacture of the zinc oxide, if desired, the finished oxide may be treated with the hydroxide. Thus, the finished zinc oxide may be placed in a slowly revolving heated drum and the hot sodium and/or potassium hydroxide solution sprayed thereon.

In the practice of the present invention it will be found that when a stock containing 100 parts American process zinc oxide and 100 parts rubber is treated with sodium hydroxide as herein described, using mercaptobenzothiazole, commercially known as "Captax", butyraldehyde anilin or tetramethylthiurammonosulfide, commercially known as "Thionex" as the accelerator, the increase in the rate of the cure of the rubber is very marked. The increase in the rate of cure, when Thionex is used as the accelerator, is more than can apparently be accounted for on a basis of the acidity of the zinc oxide, and it seems probable that the treatment assists the $CO_2$ in the air in carbonating the trace of cadmium present and forming cadmium carbonate which does not appreciably retard Thionex.

The present process is not a simple neutralization, since American process zinc oxide with an acidity reduced to 0.03–0.05%, when treated according to the present invention with sodium and/or potassium hydroxide, will cause rubber to cure as rapidly, or even more so than untreated French process zinc oxide with an acidity of 0.01 or 0.02%. And when the acidity of American process zinc oxide under the present invention is reduced to 0.01–0.02%, that is, to approximate neutrality or even to the extent that the zinc oxide becomes alkaline, the rapidity of cure is further increased, so that it may be even faster than that secured with a low acidity French process zinc oxide. Possibly part of the sodium hydroxide reacts with the zinc oxide and, although it is effective in rubber, it is not found by ordinary acidity tests. Furthermore, aging tests show that sodium hydroxide produces no deleterious aging results, and this would seem to indicate that the sodium hydroxide is combined in some way and does not exist as free alkali.

The American process zinc oxide treated with sodium and/or potassium hydroxide possesses several decided advantages. It screens more freely and more rapidly. Furthermore, generally, though not always, acidic zinc oxide incorporates with rubber with more difficulty in an enclosed mixer (such as a Banbury) than does French process zinc oxide. On the other hand, rubber stock containing the acidic zinc oxide processes best in the rubber factory after the zinc oxide is incorporated. It will be found that the alkali treatment of the present invention develops the advantages of both the French and American process zinc oxides in that the American process zinc oxide so treated incorporates nearly as well in an enclosed mixer as does the French process zinc oxide, and rubber containing it processes as well as if untreated American process zinc oxide were incorporated.

What is claimed is:

1. A zinc oxide coated with sodium sulfate.
2. A zinc oxide coated with soluble sodium compounds.
3. An acidic zinc oxide having an alkaline coating.
4. Zinc oxide pigment having an acidic surface over-coated with an alkaline material.
5. The process which consists in spraying zinc oxide having zinc sulfate on the particles with at least one of the group of hydroxides consisting of sodium hydroxide and potassium hydroxide in proportions sufficient to form a coating of $Na_2SO_4$ on said particles.

HARLAN A. DEPEW.